United States Patent
Yanagisawa et al.

(10) Patent No.: US 6,456,832 B1
(45) Date of Patent: Sep. 24, 2002

(54) ANTENNA CIRCUIT

(75) Inventors: Wasuke Yanagisawa, Machida; Shozaburo Kameda, Yokohama; Ryo Horie, Saitama; Haruhisa Uchida, Takasakishi; Junichi Imai, Annaka; Yuichi Kagoshima, Takasaki, all of (JP)

(73) Assignee: Yokowo Co., Ltd., Tokyo (JP)

( * ) Notice: Subject to any disclaimer, the term of this patent is extended or adjusted under 35 U.S.C. 154(b) by 0 days.

(21) Appl. No.: 09/357,128

(22) Filed: Jul. 20, 1999

Related U.S. Application Data

(63) Continuation of application No. PCT/JP98/00170, filed on Jan. 19, 1998.

(30) Foreign Application Priority Data

Jan. 20, 1997 (JP) .............................. 9-007383
Jun. 4, 1997 (JP) .............................. 9-161952
Jul. 22, 1997 (JP) .............................. 9-211402

(51) Int. Cl.[7] ................................ H04B 1/18
(52) U.S. Cl. ................. 455/193.1; 455/142; 455/180.1; 455/188.1; 455/191.1
(58) Field of Search .............................. 455/142, 180.1, 455/188.1, 191.1, 193.1

(56) References Cited

U.S. PATENT DOCUMENTS

| | | | | |
|---|---|---|---|---|
| 4,524,331 A | * | 6/1985 | Faith | 330/292 |
| 5,280,638 A | * | 1/1994 | Porambo et al. | 455/143 |
| 5,483,693 A | * | 1/1996 | Bose et al. | 455/273 |
| 5,937,337 A | * | 8/1999 | Marrah et al. | 455/142 |
| 6,208,847 B1 | * | 2/2001 | Kosuga | 455/142 |

* cited by examiner

Primary Examiner—William Trost
Assistant Examiner—Danh Le
(74) Attorney, Agent, or Firm—Birch, Stewart, Kolasch & Birch, LLP

(57) ABSTRACT

An antenna circuit which is improved the deterioration of amplitude characteristic in a strong electric field, an antenna circuit for AM broadcasting which can surely inhibit and damp FM-band signals in the strong electric field and amplifies to output AM-band signals, and an antenna circuit for AM/FM broadcasting in which AM-band signals are not damped by means of an FM-band filter. In the first antenna circuit, the output signal of an antenna (10) is supplied to the base of a transistor Tr2 forming a current amplification type amplifier having a high-input and low-output impedance and the emitter of the transistor Tr2 is grounded through a coil L6 and connected to an FM receiver (16) through a band-pass filter (38). In the second antenna circuit for receiving AM broadcasting, an input terminal is connected to an AM amplifier circuit (36) through coils (L7) and L8 in series and to the gate G of a field effect transistor FET. The source S of the transistor FET is grounded and the connecting point of the coils L7 and L8 is grounded through a capacitor C15 and a coil L9 in series. The second antenna circuit inhibits and damps FM-band signals in a plurality of steps. In the third antenna circuit for AM/FM broadcasting, the output signal of an antenna is divided into two parts and one part is supplied to an FM-band filter (12) through a serial FM resonance circuit (30) composed of capacitors and coils. The other part of the output signal is supplied to an AM-band filter (34).

5 Claims, 5 Drawing Sheets

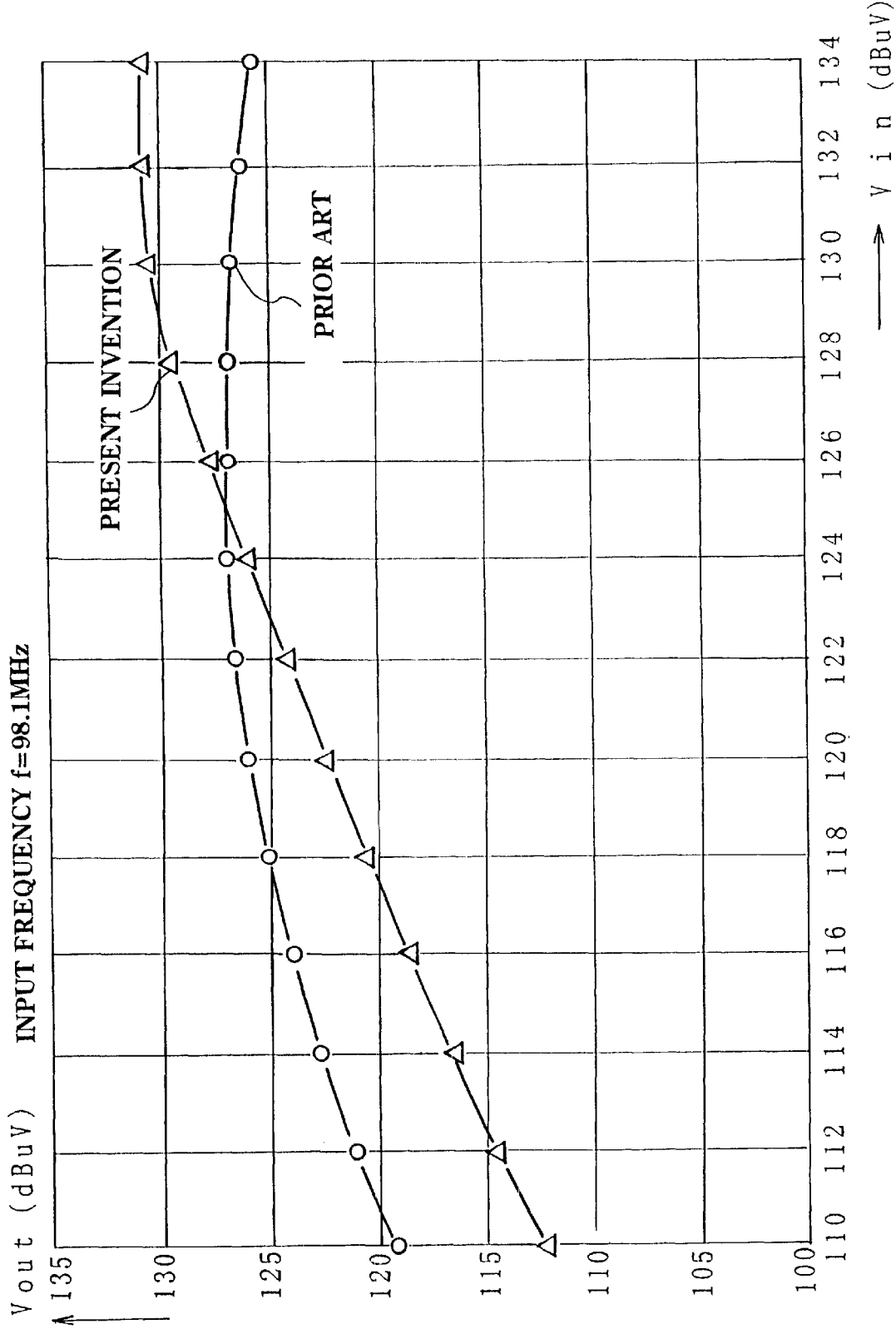

FIG.3 ( a )
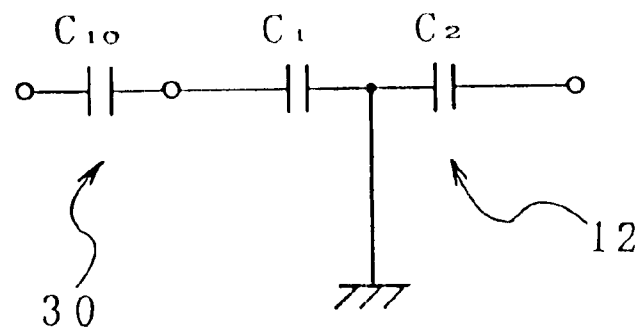
FIG.3 ( b )
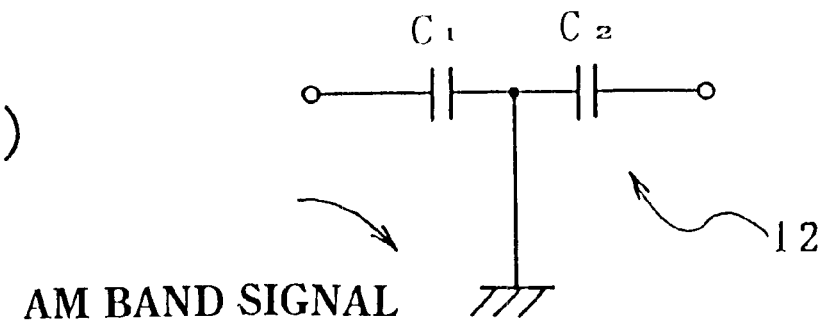
AM BAND SIGNAL

FIG.5 ( a )
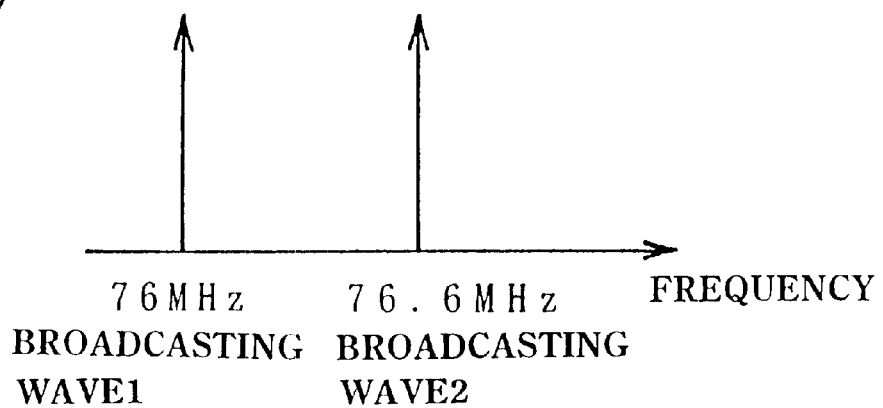
FIG.5 ( b )
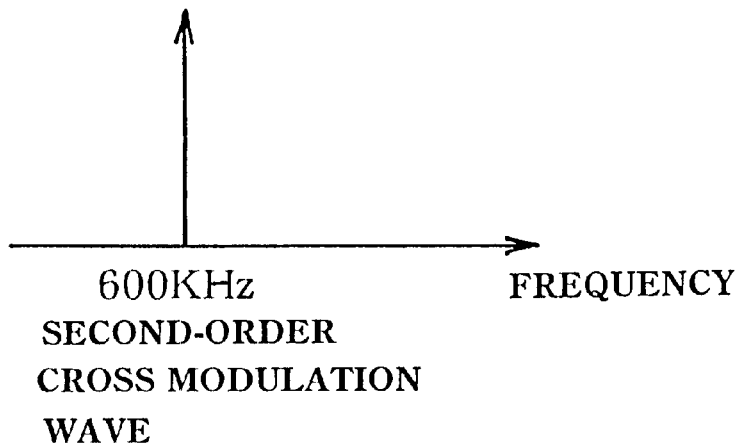

ANTENNA CIRCUIT

This application is a Continuation of PCT International Application No. PCT/JP98/00170 filed on Jan. 19, 1998, which designated the United States, and on which priority is claimed under 35 U.S.C. §120, the entire contents of which are hereby incorporated by reference.

TECHNICAL FIELD

The present invention is related to an antenna circuit for effectively transferring an antenna output signal outputted from an antenna to a receiver.

BACKGROUND OF THE INVENTION

In FIG. 4, there is shown an example of a conventional antenna circuit provided in a base terminal unit of an AM/FM receiving antenna. In FIG. 4, an antenna output signal of an AM/FM receiving antenna 10 is subdivided into two antenna output signals. One antenna output signal is supplied to an FM band filter 12, an output signal derived from this FM band filter 12 is supplied to an FM amplifying circuit 14, and furthermore, an amplified FM signal outputted from the FM amplifying circuit 14 is supplied to an FM receiver 16. Also, the other divided antenna output signal is supplied to an AM band filter 18, an antenna output signal outputted from this AM band filter 18 is supplied to an AM amplifying circuit 20, and furthermore, an amplified AM signal outputted from the AM amplifying circuit 20 is supplied to an AM receiver 22. These FM band filter 12, FM amplifying circuit 14, AM band filter 18, and AM amplifying circuit 20 are provided in either the base terminal unit of the AM/FM receiving antenna 10 or the unit near this AM/FM receiving antenna 10. The amplified output signals of the FM amplifying circuit 14 and the AM amplifying circuit 20 are transferred via a cable to both the FM receiver 16 and the AM receiver 22 in a proper manner, respectively.

In the FM band filter 12, an input terminal to which the antenna output signal is supplied is connected to an output terminal via a series-connected circuit made by sequentially connecting a capacitor C1, two coils L1, L2, and another capacitor C2 in a serial manner. Then, the FM band filter 12 is arranged by connecting a junction point between the two coils L1 and L2 via a parallel circuit of a capacitor C3 and a coil L3 to the ground.

Also, the FM amplifying circuit 14 to which the FM band signal filtered through the FM band filter 12 is supplied is arranged as follows: In other words, an input terminal is connected via a capacitor C4 to a base of a transistor Tr1. This base is grounded via a resistor R1, and also is connected via a resistor R2 to one terminal of a parallel-connected circuit made of a resistor R3 and a capacitor C5. The other terminal of this parallel-connected circuit is connected to a collector of the transistor Tr1. This collector is connected via a capacitor C6 to the output terminal. Also, this collector is connected via a series-connected circuit of a coil L4 and a resistor R4 to a power supply terminal "+B". A junction point between this coil L4 and a resistor R4 is grounded via a capacitor C7. Furthermore, an emitter of the transistor Tr1 is grounded via a parallel-connected circuit made of a resistor R5 and a capacitor C8.

Furthermore, the AM band filter 18 is so arranged that an input terminal to which the antenna output signal is supplied is connected via a coil L5 to an output terminal, and this output terminal is grounded via a capacitor C9.

In this arrangement, the FM band filter 12 may block the AM band signal and may pass the FM band signal therethrough by properly set the constants of the circuit structural elements. Then, the FM amplifying circuit 14 constitutes the emitter grounded type transistor circuit in which the radio (high) frequency load is provided at the collector of the transistor Tr1, and is operable as a voltage amplification type amplifying circuit. As a result, the FM band signal which has passed through the FM band filter 12 is voltage-amplified by the voltage amplification effect of this transistor Tr1, and then, the voltage-amplified FM band signal is outputted. Also, in the circuit arrangement of this FM amplifying circuit 14, the input impedance is made substantially equal to the output impedance, and the output impedance of the AM/FM receiving antenna 10 via the FM band filter 12 is matched with the input impedance of the FM receiver 16.

In this arrangement, the AM band filter 18 may block the FM band signal and may pass the AM band signal therethrough by properly set the constants of the circuit structural elements. Only the AM band signal is amplified by the AM amplifying circuit 20 to output the amplified AM band signal.

On the other hand, in the above-explained conventional FM amplifying circuit 14, the voltage of the FM band signal functioning as the input signal to be amplified is applied between the base of the transistor Tr1 and the emitter thereof, and furthermore, the voltage of the amplified output signal is applied between the collector of the transistor Tr1 and the emitter thereof. Then, when both the input signal and the output signal are increased, the amplification characteristic defined by the amplifying capability and the bias condition of the transistor Tr1 exceeds a pre-selected range indicative of the linearity, so that high frequency (radio frequency) distortions and cross modulation distortions would occur. Then, this input/output signal amplitude characteristic is indicated by a circle symbol in FIG. 2 under such a condition that the amplitude of the output signal is saturated with respect to the increase of the amplitude of the input signal. Accordingly, there is such a problem that the cross modulation distortion is strengthened under such high electric fields as a place near an FM broadcasting signal transmission station, and therefore, radio interference would occur.

Also, as shown in FIG. 5($a$), assuming now that as FM band signals of high electric fields, for example, two broadcasting waves 1 and 2 having frequencies of 76 MHz and 76.6 MHz are present, these broadcasting waves 1 and 2 are applied to the AM amplifying circuit 20 without being sufficiently attenuated/blocked by the AM band filter 18. As a result, as shown in FIG. 5($b$), the second-order cross modulation wave of 600 KHz equal to a frequency difference between the two broadcasting waves 1 and 2 is also amplified by the AM amplifying circuit 20 to output the amplified second-order cross modulation wave. This 600 KHz signal is contained in the frequency range of the AM band signal, and may function as the interference wave in the AM receiver 22.

Furthermore, conventionally, as the AM/FM receiving antenna 10, such an antenna having a physical length of approximately 1 m is generally used. Thus, the antenna output signal having the practically high level with respect to the AM band signal could be obtained from this general-purpose antenna. On the other hand, since a strong demand is recently made of compact antennas, there is such a trend that as to the AM/FM receiving antenna 10, a shorter antenna is used by employing a helical coil and the like, while the antenna effective length is equal to approximately 1 m with respect to the FM band signal, but the antenna physical length is made shorter than, or equal to 50 cm.

Thus, although the antenna output signal for the FM band signal could be obtained at the substantially same level as that of the conventional antenna, the level of the AM band signal would be largely reduced. As a result, this may cause a serious problem. That is, the attenuation of the AM band signal by the FM band filter 12 cannot be neglected. This is because the coils L1 and L3 which constitute the FM band filter 12 own the small impedances with respect to the AM band signal, and the AM band signal is largely attenuated via the capacitor C1, as represented in the equivalent circuit diagram shown in FIG. 3(b). Thus, since the AM band signal supplied the AM band filter 18 is reduced, there is such a problem that the reception sensitivity with respect to the AM band signal would be largely deteriorated.

DISCLOSURE OF THE INVENTION

The present invention has an object to provide an antenna circuit capable of improving deterioration of an amplification characteristic thereof under high electric field. Also, the present invention has an object to provide an AM receiving antenna circuit capable of firmly blocking/attenuating an FM band signal of a high electric field, and also capable of passing the AM band signal without attenuating this AM band signal, and furthermore capable of outputting the amplified AM band signal. Moreover, the present Invention has an object to provide an AM/FM receiving antenna circuit by which even when an antenna having a short dimension is employed, an AM band signal is not attenuated by an FM band filter, and an AM band signal is supplied to an AM band filter while maintaining a practically high signal level.

To achieve the objects, an antenna circuit, according to the present invention, is arranged by that an antenna output signal is applied to an input terminal of a current amplification type amplifier having a high input impedance and also a low input impedance; an output terminal of the current amplification type amplifier is connected to an input terminal of a band-pass filter; and a signal is outputted from an output terminal of this band-pass filter to a receiver, and the above-described band-pass filter may pass therethrough all band signals of the reception frequencies of the receiver. With employment of the above-described arrangement, an open-output-signal voltage of an AM/FM receiving antenna can be directly applied to the input terminal of the FM receiver without being attenuated, so that a high gain can be obtained. Moreover, the distortion characteristic in the input/output signal amplitude characteristic becomes superior.

Also, an AM receiving antenna circuit, according to the present invention, is featured by such an AM receiving antenna circuit comprising: an AM band filter for blocking an FM band signal contained in an antenna output signal and also for passing an AM band signal therethrough; and an AM amplifying circuit for amplifying the filtered AM band signal to output the amplified AM band signal, wherein: the AM band filter is arranged in such a manner that an input terminal to which the antenna output signal is supplied is connected via a series circuit made of a first coil and a second coil to an AM signal input terminal of the AM amplifying circuit, and a junction point between the first coil and second coil is grounded via a series circuit made of a capacitor and a third coil; and the AM amplifying circuit is arranged in such a manner that a field-effect transistor is included, the AM signal input terminal is connected to a gate of the field-effect transistor, a source thereof is grounded; a first filter for blocking an FM band signal is formed by the first coil and the capacitor; a trap circuit for attenuating the FM band signal is formed by the capacitor and the third coil; and a second filter for blocking the FM band signal is formed by the second coil and an input capacitance formed between the gate of the filed-effect transistor and the source thereof. With employment of the above-explained arrangement, the first filter and the second filter, which may block the FM band signal, the second filter, and the trap circuit are formed, the FM band signal is sufficiently attenuated/blocked in plural stages, and thus, only the AM band signal is supplied to the AM amplifying circuit.

Then, an AM/FM receiving antenna circuit, according to the present invention, is featured by such an AM/FM receiving antenna circuit for subdividing an antenna output signal into two antenna output signals and for supplying these two antenna signals to an FM band filter for blocking an AM band signal and also for passing an FM band signal therethrough and also to an AM band filter for blocking the FM band signal and also for passing the AM band signal therethrough, wherein: one of the subdivided antenna output signal is first supplied to a capacitor, an output of this capacitor is supplied to a coil, and then this subdivided antenna signal is supplied to the FM band filter via an FM series resonant circuit constituted by the above-explained capacitor and coil. With employment of the above-described arrangement, even when the impedance of the coil of the series resonant circuit and the impedance of the coil of the FM band filter are small with respect to the AM band signal, the AM band signal is attenuated via the series circuit made of the capacitor of the FM series resonant circuit and the capacitor of the FM band filter. However, this AM band signal is not largely attenuated by the FM band filter similar to the prior art.

BRIEF DESCRIPTION OF THE DRAWINGS

FIG. 2 is a characteristic diagram for representing a comparison between the input/output signal amplitude characteristic of the conventional FM amplifying circuit and an input/output signal amplitude characteristic of the FM amplifying circuit shown in FIG. 1, under high electric fields.

FIG. 3 represents equivalent circuit diagrams of the FM band filter shown in FIG. 1 and of the conventional FM band filter with respect to the AM band signal; FIG. 3(a) shows an equivalent circuit diagram of the present invention; and FIG. 3(b) indicates an equivalent circuit diagram of the prior art.

FIG. 5 is an explanatory diagram for explaining the problems of the conventional AM receiving antenna circuit, caused by presence of the FM band signal under the high electric field; FIG. 5(a) is a diagram for representing presence of two FM-band broadcasting signals having a frequency difference of the AM band; and FIG. 5(b) is a diagram for showing a second-order cross modulation wave caused by this frequency difference.

BEST MODE FOR CARRYING OUT THE INVENTION

Referring now to accompanying drawings, the present invention will be described in detail.

Figure 1:
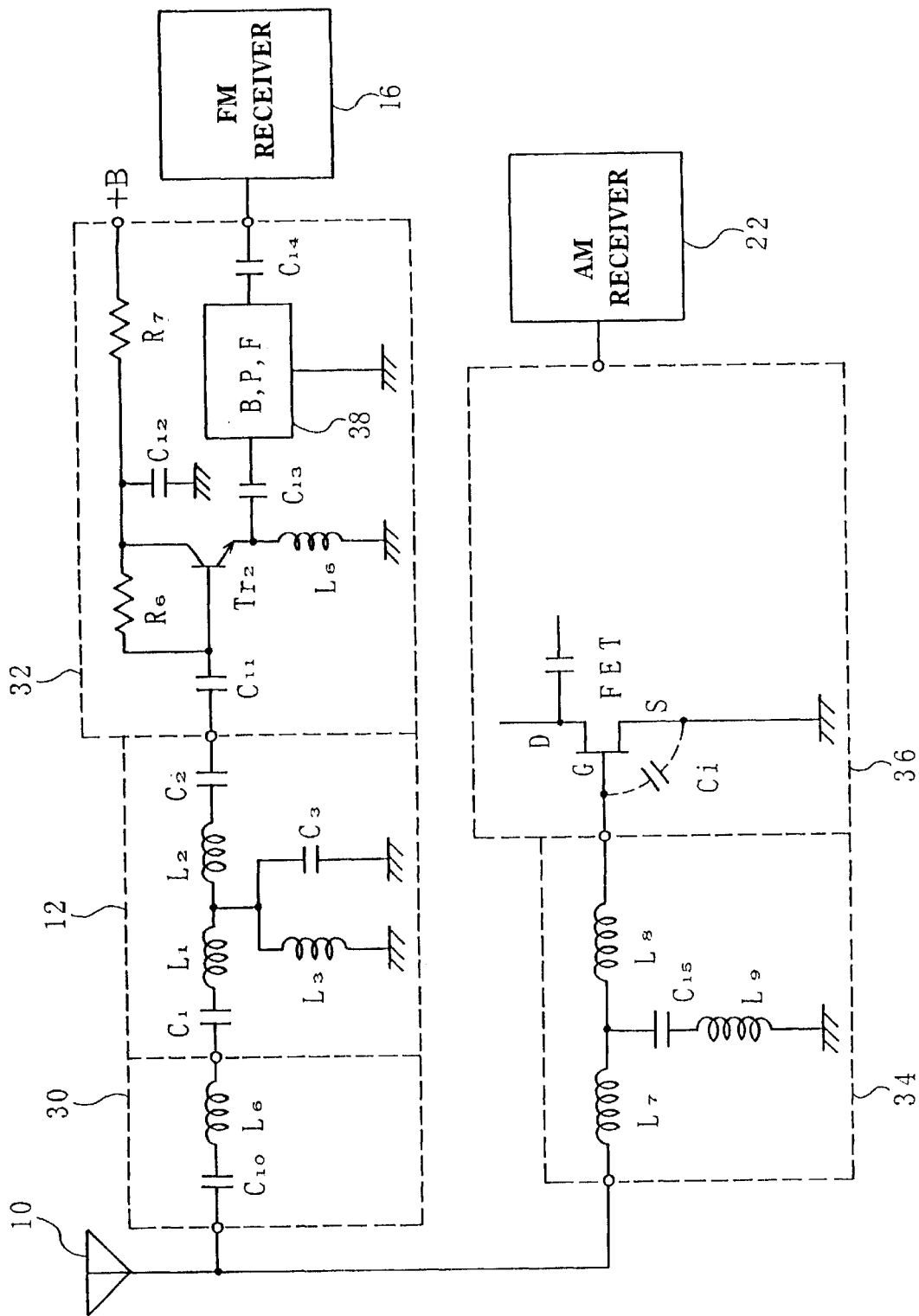
FIG. 1 is a circuit diagram of an antenna circuit according to an embodiment of the present invention.
Figure 4:
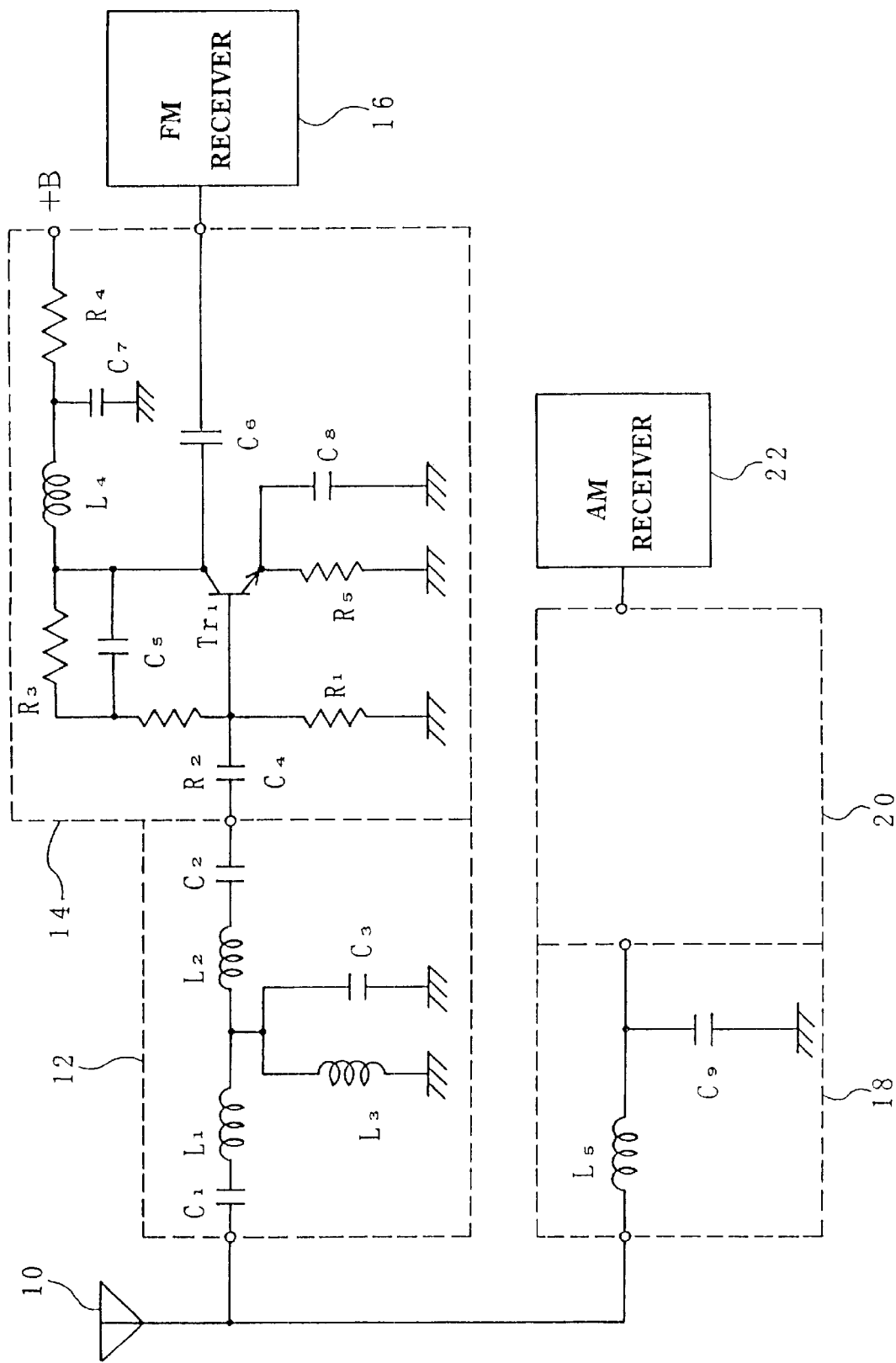
FIG. 4 is a circuit diagram for denoting one example of the conventional antenna circuit.

In FIG. 1, an antenna output signal of an AM/FM receiving antenna 10 is subdivided into two antenna output signals. One antenna output signal is supplied via an FM series resonant circuit 30 to an FM band filter 12, an output signal derived from this FM band filter 12 is supplied to an FM amplifying circuit 32, and furthermore, an amplified FM signal outputted from the FM amplifying circuit 32 is supplied to an FM receiver 16. Also, the other divided antenna output signal is supplied to an AM band filter 34, an antenna output signal outputted from this AM band filter 34 is supplied to an AM amplifying circuit 36, and furthermore, an amplified AM signal outputted from the AM amplifying circuit 36 is supplied to an AM receiver 22. These FM series resonant circuit 30, FM band filter 12, FM amplifying circuit 32, AM band filter 34, and AM amplifying circuit 36 are provided in either the base terminal unit of the AM/FM receiving antenna 10 or the unit near this AM/FM receiving antenna 10. The amplified output signals of the FM amplifying circuit 32 and the AM amplifying circuit 36 are transferred via a cable to both the FM receiver 16 and the AM receiver 22 in a proper manner, respectively.

In the FM series resonant circuit 30, an input terminal thereof to which an antenna output signal is supplied is first connected to a capacitor C10, the other terminal thereof is connected to a coil L6, and this input terminal is connected to an output terminal via a series circuit made of the above-described capacitor C10 and coil L6. Then, this output terminal is connected to the input terminal of the FM band filter 12 similar to the prior art. It should be noted that a resonant circuit where the FM band signal is resonated is arranged by this capacitor C10 and the coil L6.

Then, the FM amplifying circuit 32 to which the FM band signal filtered through the FM band filter 12 is supplied is arranged as follows: In other words, an input terminal is connected via a capacitor C11 to a base of a transistor Tr2. This base is connected via a resistor R6 to a collector of the transistor Tr2. Then, this collector is grounded via a capacitor C12, and also is connected via a resistor R7 to a power supply terminal "+B". Also, an emitter of the transistor Tr2 is grounded via a coil L6, and is connected via a capacitor C13 to an input terminal of a band-pass filter 38. The output terminal of this band-pass filter 38 is connected via a capacitor C14 to an output terminal. In this case, the band-pass filter 38 owns such a characteristic capable of passing therethrough the entire band signals of the FM band signal and also capable of blocking penetrations of other frequency band signals such as the AM band signal.

Also, in the AM band filter 34, an input terminal to which the antenna output signal is supplied is connected via a series circuit constructed of two coils L7 and L8 to an input terminal of an AM amplifying circuit 36. Then, a junction point between these two coils L7 and L8 is successively series-connected via coils L7 and L8 to the ground. Furthermore, the AM amplifying circuit 36 is constituted by containing a field-effect transistor FET as an amplifying element. The input terminal of the AM amplifying circuit 36 is connected to a gate G of the field-effect transistor FET, and a source S thereof is grounded. It should also be noted that an input capacitance Ci is present between the gate G of this field-effect transistor FET and a source S thereof.

In this circuit arrangement, the FM series resonant circuit 30 is set in such a manner that the FM band signal is resonated, and furthermore, the capacitance of the capacitor C10 is reduced as small as possible. As a consequence, the FM band signal may pass without being attenuated by the FM series resonant circuit 30. Then, even when the impedance of the coil L6 of the FM series resonant circuit 30 and the impedances of the coils L1 and L3 of this FM band filter 12 are small with respect to the AM band signal, as indicated in the equivalent circuit of FIG. 3(a), the AM band signal is attenuated via the series circuit constructed of the capacitor C10 and the capacitor C1. As a result, there is no possibility that the AM band signal is not greatly attenuated by the FM band filter 12 as similar to that of the prior art. Thus, the AM band signal may be applied to the AM band filter 34 without being largely attenuated, and this filtered AM band signal having a large level may be applied to the AM receiver 22. It should be noted that in particular, since the capacitance of the capacitor C10 to which the antenna output is first supplied is made small, this capacitor can have a large impedance with respect to the AM band signal so as to effectively block passing of this AM band signal. As a result, it is possible to suppress that the AM band signal is transferred to the circuit provided at the post stage of the capacitor C10, and the AM band signal is not unnecessarily radiated from the circuit provided at the post stage of this capacitor C10. Furthermore, the impedance constituted by the series circuit made of the capacitor C10 and the capacitor C1 with respect to the AM band signal can be made large, and therefore, the attenuation can be more effectively suppressed.

Also, the FM amplifying circuit 32 constitutes a collector grounded type transistor amplifying circuit in which a high frequency load is provided with the emitter of the transistor Tr2, and may function as a current amplification type amplifier. Then, the FM band signal functioning as the input signal is current-amplified by the current amplification effect of this transistor Tr2. In this case, this current amplification type amplifier has such a characteristic of a high input impedance, and also a low output impedance. Then, the input impedance of the FM amplifying circuit 32 is sufficiently higher than the output impedance of the AM/FM receiving antenna 10, and an open-output-signal voltage of the AM/FM receiving antenna 10 is supplied to the input terminal of the FM amplifying circuit 32 without may attenuation. Also, the output impedance of this FM amplifying circuit 32 is sufficiently lower than the input impedance of the FM receiver 16, and the output signal voltage appearing at the output terminal of the FM amplifying circuit 32 is applied to the input terminal of the FM receiver 16 without being attenuated. Thus, the open-output-signal voltage of the AM/FM receiving antenna 10 may be directly applied to the input terminal of the FM receiver 16 without being attenuated.

On the other hand, a gain 1 [0 dB] of such a system that a matching condition is established by employing, for example, either 50 ohms or 75 ohms implies such a condition that approximately a half voltage produced by subdividing the open-output-signal voltage of the AM/FM receiving antenna 10 based upon both the output impedance of this AM/FM receiving antenna 10 and the input impedance of the FM receiver 16 is applied to the input terminal of the FM receiver 16. As a consequence, in the FM amplifying circuit 32 of the present invention, the open-output-signal voltage of the AM/FM receiving antenna 10 is directly applied to the input terminal of the FM receiver 16 without being subdivided, and the signal voltage which is approximately two times higher than that of the prior art is applied to the input terminal of the FM receiver 16. Thus, in the FM amplifying circuit 32 of the present invention, the apparent gain is equal to 2 [6 dB]. Practically speaking, since the current amplification factor of the current amplification type amplifier is finite, the input impedance is not infinite, and furthermore, the output impedance is not equal to zero, the apparent gain is located between 5 dB and 6 dB.

Furthermore, in the current amplification type amplifier employed in the FM amplifier 32, since the output signal voltage produced across the terminals of the load is operated as the feedback voltage to the transistor Tr2, a small difference voltage between the input signal voltage and the feedback voltage is applied between the base and the emitter of the transistor Tr2. Also, since the output impedance is small, the voltage between the collector of the transistor Tr2 and the emitter thereof becomes also small, as compared with that of the conventional voltage amplification type amplifier. As a result, the current amplification type amplifier employed in the FM amplifying circuit 32 owns a superior distortion characteristic, as compared with that of the conventional voltage amplification type amplifier.

FIG. 2 represents input/output characteristic data which are acquired in such a way that a current amplification type amplifier employed in the present invention, and the conventional voltage amplification type amplifier are manufactured by employing the transistors Tr1 and Tr2 having the same structures, and then, these amplifiers are compared/measured. In FIG. 2, the characteristic of the present invention is indicated by a triangle symbol, whereas the characteristic of the prior art is indicated by a circle symbol. As apparent from FIG. 2, even in such a range that a relationship of the output signal amplitude with respect to the increase of the input signal amplitude would be saturated in the prior art, the linearity can be maintained in a very broader range in the present invention. As a result, in accordance with the present invention, the distortion characteristic under high electric field can be greatly improved.

Furthermore, since the emitter of the transistor Tr2 functioning as the output terminal of the current amplification type amplifier employed in the FM amplifying circuit 32 is connected via the band-pass filter 38 capable of passing therethrough only the all band signals of the reception frequencies of the FM receiver 16 to the output terminal, passing of the signals other than the FM band signal is blocked, and the signals are not delayed/reflected by the FM receiver 16. There is no risk that since this delayed/reflected signal is supplied to the emitter of the transistor Tr2 in the positive feedback manner, unnecessary oscillation will occur. As a consequence, since the band-pass filter 38 is interposed, the stable amplification effect can be achieved. Then, since the collector grounded type transistor amplifying circuit is employed as the current amplification type amplifier, the circuit arrangement can be relatively simplified, and may be constituted in a simple manner and in low cost by employing a commercially available circuit chip.

In the above-described embodiment, the transistor Tr2 has been employed to construct the current amplification type amplifier. The present invention is not limited thereto, but a drain grounded type field-effect transistor amplifying circuit may be alternatively employed in which while a field-effect transistor is employed, a signal is applied to gate of this field-effect transistor and a high frequency load is provided at a source thereof. Even when this drain grounded type field-effect transistor amplifying circuit is employed, the circuit arrangement may be relatively made simple, and may be simply constituted in low cost with employment of the commercially available circuit chip and the like. Also, the band-pass filter 38 may be arranged as such a filter capable of passing therethrough the all band signals of the reception frequencies of the receiver, and thus, may be arranged by employing any types of circuit arrangements. Furthermore, in the above embodiment, the FM amplifying circuit 32 for receiving the FM band signal has been explained. The present invention is not limited thereto. Alternatively, since the pass band of the band-pass filter 38 is properly set in accordance with the used frequency band, this band-pass filter may be applied to amplifying circuits operable in any signal bands.

Moreover, in the AM signal receiving antenna circuit, according to the present invention, which is arranged by both the AM band filter 34 and the AM amplifying circuit 36, a first filter is formed by the coil L7 and the capacitor C15 so as to block and attenuate the FM band signal, and also the coil L7, the coil L9, and the capacitor C15 are properly set in order to form the trap circuit capable of attenuating the FM band signal by employing the capacitor C15 and the coil L9. In addition, the coil L8 is properly set so as to form a second filter capable of blocking and attenuating the FM band signal by employing the coil L8 and the input capacitance Ci of the field-effect transistor FET. As a consequence, the FM band signal is sufficiently attenuated/blocked in the plural stages by the first filter, the second filter, which block the FM band signal, and the trap circuit, so that only the AM band signal may be applied to the AM amplifying circuit 36 so as to be amplified.

On the other hand, since the antenna effective length of the short AM/FM receiving antenna 10 is very short with respect to the wavelength of the AM band signal, the output impedance of this AM/FM receiving antenna 10 is very high and also the equivalent output capacitance thereof is small with respect to the AM band signal. As a result, since the input terminal of the AM amplifying circuit 36 is connected to the gate G of the field-effect transistor FET, the input impedance for the AM receiving antenna circuit is made high. Also, as the junction point between the coils L7 and L8 is connected via the series circuit made of the capacitor C15 and the coil L9 to the ground, the equivalent input capacitance of the AM receiving antenna circuit is made small. Therefore, the AM/FM receiving antenna 10 can be matched with the AM receiving antenna circuit, so that there is no attenuation of the antenna output signal caused by the reflections. As a result, the reception by the AM receiver is not interfered by the FM band signal under high electric field. Moreover, the AM band signal can be more effectively applied to the AM receiver. It should be apparent that the AM band signal is not attenuated in the AM band filter 34.

INDUSTRIAL APPLICABILITY

As previously described, in accordance with the antenna circuit of the present invention, the amplification characteristic of the FM band signal under high electric field can be improved. Also, while the FM band signal under high electric field is firmly attenuated, this attenuated FM band signal can be applied to the AM band filter without attenuating the AM band signal. Furthermore, the AM band signal is not attenuated by the FM band filter. This there is no interference in the AM band signal, which is caused by the FM band signal under high electric field. Also, the small-sized AM/FM receiving antenna circuit can be suitably arranged with employing the short antenna with respect to the AM band signal.

What is claimed is:

1. An antenna circuit wherein:
    said antenna circuit is arranged by that an antenna output signal is applied to a series resonant circuit having a capacitor and a coil connected in series; and an output signal of said coil of said series resonant circuit is applied to an input terminal of a current amplification type amplifier having a high input impedance and also a low output impedance; an output terminal of said current amplification type amplifier is connected to an input terminal of a band-pass filter; and a signal is outputted from an output terminal of this band-pass filter is outputted to a receiver, whereby said band-pass filter is arranged in such a manner that all band signals of reception frequencies of said receiver pass through said band-pass filter.

2. An antenna circuit as claimed in claim 1 wherein:

said current amplification type amplifier is arranged by either a drain grounded type field-effect transistor amplifying circuit in which a load is provided in a source, or a collector grounded type transistor amplifying circuit in which a load is provided in an emitter.

3. An antenna circuit as claimed in claim 1 wherein:

said band-pass filter is arranged by that an FM band signal passes therethrough, and said receiver is an FM receiver.

4. An AM receiving antenna circuit comprising: an AM band filter for blocking an FM band signal contained in an antenna output signal and also for passing an AM band signal therethrough; and an AM amplifying circuit for amplifying the filtered AM band signal to output the amplified AM band signal, wherein: said AM band filter is arranged in such a manner that an input terminal to which said antenna output signal is supplied is connected via a series circuit made of a first coil and a second coil to an AM signal input terminal of said AM amplifying circuit, and a junction point between said first coil and second coil is successively series-connected via a capacitor and a third coil to the ground; and said AM amplifying circuit is arranged in such a manner that a field-effect transistor is included, said AM signal input terminal is connected to a gate of said field-effect transistor, and a source thereof is grounded, whereby a first filter for blocking the FM band signal is formed by said first coil and said capacitor; a trap circuit for attenuating the FM band signal is formed by said capacitor and said third coil; and a second filter for blocking the FM band signal is formed by said coil and an input capacitance produced between the gate of said field-effect transistor and the source thereof.

5. An AM/FM receiving antenna circuit for subdividing an antenna output signal into two antenna output signals and for supplying these two antenna signals to an FM band filter for blocking an AM band signal and also for passing an FM band signal therethrough and also to an AM band filter for blocking the FM band signal and also for passing the AM band signal therethrough, wherein:

one of said subdivided antenna output signal is first supplied to a capacitor; an output of said capacitor is supplied to a coil; and said one subdivided antenna output signal is supplied to said FM band filter via an FM series resonant circuit constituted by series-connecting said capacitor and said coil.

* * * * *